United States Patent
Tainsh et al.

(10) Patent No.: US 10,318,816 B2
(45) Date of Patent: Jun. 11, 2019

(54) METHOD, SYSTEM AND APPARATUS FOR SEGMENTING AN IMAGE SET TO GENERATE A PLURALITY OF EVENT CLUSTERS

(71) Applicant: CANON KABUSHIKI KAISHA, Tokyo (JP)

(72) Inventors: Mark Ronald Tainsh, Pymble (AU); Alex Penev, Eastlakes (AU); Sammy Chan, Beecroft (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/190,528

(22) Filed: Jun. 23, 2016

(65) Prior Publication Data
US 2016/0379058 A1 Dec. 29, 2016

(30) Foreign Application Priority Data
Jun. 26, 2015 (AU) .............................. 2015203570

(51) Int. Cl.
*G06K 9/00* (2006.01)

(52) U.S. Cl.
CPC ..... *G06K 9/00765* (2013.01); *G06K 9/00718* (2013.01); *G06K 2009/00738* (2013.01); *G06K 2209/27* (2013.01)

(58) Field of Classification Search
CPC .......... G06K 9/00765; G06K 9/00718; G06K 2209/27; G06K 2009/00738
USPC ........ 382/173, 170, 195, 218, 224; 358/453; 707/E17.02; 607/41
See application file for complete search history.

(56) References Cited

U.S. PATENT DOCUMENTS

| | | | | |
|---|---|---|---|---|
| 6,865,297 B2* | 3/2005 | Loui | ................... | G06K 9/0063 358/453 |
| 6,915,011 B2* | 7/2005 | Loui | ................... | G06F 17/3025 382/173 |
| 7,636,733 B1* | 12/2009 | Rothmuller | ....... | G06F 17/30265 382/305 |
| 7,640,218 B2 | 12/2009 | Cooper | | |
| 7,747,625 B2 | 6/2010 | Gargi | | |
| 8,521,292 B2* | 8/2013 | Wei | ................... | A61N 1/36007 607/41 |
| 8,818,113 B2 | 8/2014 | Maunder | | |
| 8,885,944 B2* | 11/2014 | Yabu | ..................... | H04N 1/387 382/195 |

(Continued)

*Primary Examiner* — Aaron W Carter
(74) *Attorney, Agent, or Firm* — Canon U.S.A., Inc. I.P. Division

(57) ABSTRACT

Generating a plurality of event clusters by segmenting an image set. Each event cluster includes at least one image from the image set. The image set, having time metadata corresponding to each image in the set, is accessed. A time interval between each pair of neighboring images in the image set is determined. The neighboring images in each of the pairs are adjacent in a time ordered sequence. The time interval for each of the pairs is determined from time metadata associated with each image in the pair. An adjustment value is determined for one or more of the determined time intervals based on at least one of predetermined time of day information and calendar information. The images in the image set are segmented to generate the plurality of event clusters. Segmentation boundaries for each event cluster are determined using at least the determined adjustment value.

17 Claims, 12 Drawing Sheets

(56) References Cited

U.S. PATENT DOCUMENTS

| | | | |
|---|---|---|---|
| 9,098,775 B2* | 8/2015 | Matsunaga | G06K 9/6227 |
| 9,843,649 B1* | 12/2017 | Hampson | H04L 67/325 |
| 2004/0075752 A1* | 4/2004 | Valleriano | H04N 5/772 |
| | | | 348/231.3 |
| 2005/0111824 A1* | 5/2005 | Hunter | G06K 9/00711 |
| | | | 386/240 |
| 2005/0280719 A1* | 12/2005 | Kim | G06F 17/30256 |
| | | | 348/231.2 |
| 2006/0200475 A1* | 9/2006 | Das | G06F 17/30256 |
| 2007/0094251 A1* | 4/2007 | Lu | G06F 17/30056 |
| 2007/0136275 A1* | 6/2007 | Wan | G06F 17/30265 |
| 2010/0077289 A1* | 3/2010 | Das | G06F 17/30265 |
| | | | 715/230 |
| 2010/0156834 A1* | 6/2010 | Sangster | G06K 9/00295 |
| | | | 345/173 |
| 2010/0329575 A1* | 12/2010 | Scalise | G03D 15/003 |
| | | | 382/218 |
| 2012/0051644 A1* | 3/2012 | Das | G06F 17/30265 |
| | | | 382/190 |
| 2012/0301039 A1* | 11/2012 | Maunder | G06F 17/30265 |
| | | | 382/225 |
| 2012/0303610 A1* | 11/2012 | Zhang | G06F 17/3028 |
| | | | 707/722 |
| 2015/0110407 A1* | 4/2015 | Sinha | G06K 9/6267 |
| | | | 382/225 |
| 2016/0379058 A1* | 12/2016 | Tainsh | G06K 9/00765 |
| | | | 382/173 |
| 2017/0177942 A1* | 6/2017 | Rao | G06K 9/00718 |

\* cited by examiner

METHOD, SYSTEM AND APPARATUS FOR SEGMENTING AN IMAGE SET TO GENERATE A PLURALITY OF EVENT CLUSTERS

REFERENCE TO RELATED PATENT APPLICATION(S)

This application claims the benefit under 35 U.S.C. § 119 of the filing date of Australian Patent Application No. 2015203570, filed Jun. 26, 2015, hereby incorporated by reference in its entirety as if fully set forth herein.

TECHNICAL FIELD

The present invention relates to digital photography and, in particular, to a method, system and apparatus for segmenting an image set to generate a plurality of event clusters. The present invention also relates to a computer program product including a computer readable medium having recorded thereon a computer program for segmenting an image set to generate a plurality of event clusters.

BACKGROUND

Segmenting a set of images into events is useful for organising images so that the images can be more easily accessed. Events are also useful for arranging images in photo books. For example, images from an event may be restricted to a single spread in the photo book. Events may be determined based on information including image timestamps, geo-location, and pixel information.

SUMMARY

It is an object of the present invention to substantially overcome, or at least ameliorate, one or more disadvantages of existing arrangements.

Disclosed are arrangements which seek to address the problems with conventional methods of determining events for a set of images by using image timestamps as input and adjusting a time gap between images. The time gap is reduced where the gap coincides with expected sleeping hours. In one aspect of the present disclosure, time differences between adjacent images in a time ordered list of images are determined and distance outliers are identified to be the boundaries between events. The reduction of the gaps that coincide with the expected sleeping hours results in multi-day events being less likely to be segmented by the lack of night-time images without affecting likelihood that events that occur inside a single day are not recognised.

In one aspect of the present disclosure, a period of the gap that coincides with weekend or multi-day festival sleeping hours are further reduced resulting in better detection of weekend and multi-day festival events. Examples of such events are: weekend trips; or a festival holiday.

In another aspect of the present disclosure, there is provided a computer implemented method of segmenting an image set to generate a plurality of event clusters, each event cluster including at least one image from the image set, said method comprising:

accessing the image set having time metadata corresponding to each image in the set;

determining a time interval between each pair of neighbouring images in the image set, the neighbouring images in each of said pairs being adjacent in a time ordered sequence, said time interval for each of said pairs being determined from time metadata associated with each image in the pair;

determining an adjustment value for one or more of the determined time intervals based on at least one of predetermined time of day information and calendar information; and segmenting the images in the image set to generate the plurality of event clusters, wherein segmentation boundaries for each event cluster are determined using at least the determined adjustment value.

In another aspect of the present disclosure, there is provided an apparatus for segmenting an image set to generate a plurality of event clusters, each event cluster including at least one image from the image set, said apparatus comprising:

means for accessing the image set having time metadata corresponding to each image in the set;

means for determining a time interval between each pair of neighbouring images in the image set, the neighbouring images in each of said pairs being adjacent in a time ordered sequence, said time interval for each of said pairs being determined from time metadata associated with each image in the pair;

means for determining an adjustment value for one or more of the determined time intervals based on at least one of predetermined time of day information and calendar information; and means for segmenting the images in the image set to generate the plurality of event clusters, wherein segmentation boundaries for each event cluster are determined using at least the determined adjustment value.

In another aspect of the present disclosure, there is provided a system for segmenting an image set to generate a plurality of event clusters, each event cluster including at least one image from the image set, said system comprising:

a memory for storing data and a computer program;

a processor coupled to the memory for executing the computer program, said computer program comprising instructions for:

code for accessing the image set having time metadata corresponding to each image in the set;

code for determining a time interval between each pair of neighbouring images in the image set, the neighbouring images in each of said pairs being adjacent in a time ordered sequence, said time interval for each of said pairs being determined from time metadata associated with each image in the pair;

code for determining an adjustment value for one or more of the determined time intervals based on at least one of predetermined time of day information and calendar information; and code for segmenting the images in the image set to generate the plurality of event clusters, wherein segmentation boundaries for each event cluster are determined using at least the determined adjustment value.

In another aspect of the present disclosure, there is provided a non-transitory computer readable medium having a program stored thereon for segmenting an image set to generate a plurality of event clusters, each event cluster including at least one image from the image set, said program comprising:

code for accessing the image set having time metadata corresponding to each image in the set;

code for determining a time interval between each pair of neighbouring images in the image set, the neighbouring images in each of said pairs being adjacent in a time ordered sequence, said time interval for each of said pairs being determined from time metadata associated with each image in the pair;

code for determining an adjustment value for one or more of the determined time intervals based on at least one of predetermined time of day information and calendar information; and code for segmenting the images in the image set to generate the plurality of event clusters, wherein segmentation boundaries for each event cluster are determined using at least the determined adjustment value.

Other aspects are also disclosed.

BRIEF DESCRIPTION OF THE DRAWINGS

One or more embodiments of the invention will now be described with reference to the following drawings, in which.

DETAILED DESCRIPTION INCLUDING BEST MODE

With the proliferation of digital photography, the number of images which people capture has increased significantly. However, as the number of images increases, image collections become more difficult to manage, to sort through and to find images.

Timestamps indicating time of capture of an image are easily obtained and require little processing which is particularly important, for example, when event segmentation is an early step in a photo album creation process. One method of determining events for a set of images based only on image timestamps determines time differences between adjacent images in a time ordered list of the images and identifies distance outliers. The outliers represent candidates for event boundaries. Such a method can be effective but is prone to missing events that span multiple days.

Conventional methods of determining events using only timestamps to identify the events are based on an assumption that images will be captured with more frequency at an event. Such conventional methods also assume that a relatively large gap between two images indicates that an event has ended and/or that a new event has started. The methods may not recognise events that span multiple days, such as a weekend trip, since a gap in capturing images while a photographer is sleeping will have the same weight as the same gap occurring during the day.

Methods of grouping a collection of images into events in order to organise the image collection and to assist a user in recognising different parts of the image collection, are described below. The described methods may also be used in photo album generation applications, where an image collection is broken into events allowing the user to select which of the events are represented in a photo album.

As described above, image timestamps are easily obtained and require little processing which is advantageous when event segmentation is an early step in a photo album creation process. In one arrangement of the described methods, a time gap sequence corresponding to image timestamps of a set of images is determined and the time gap sequence is modified by considering photographer unavailability such as, for example, a time interval when a photographer would be expected to be sleeping. The modified time gap sequence may then be used to cluster the images into events.

Figure 11A:
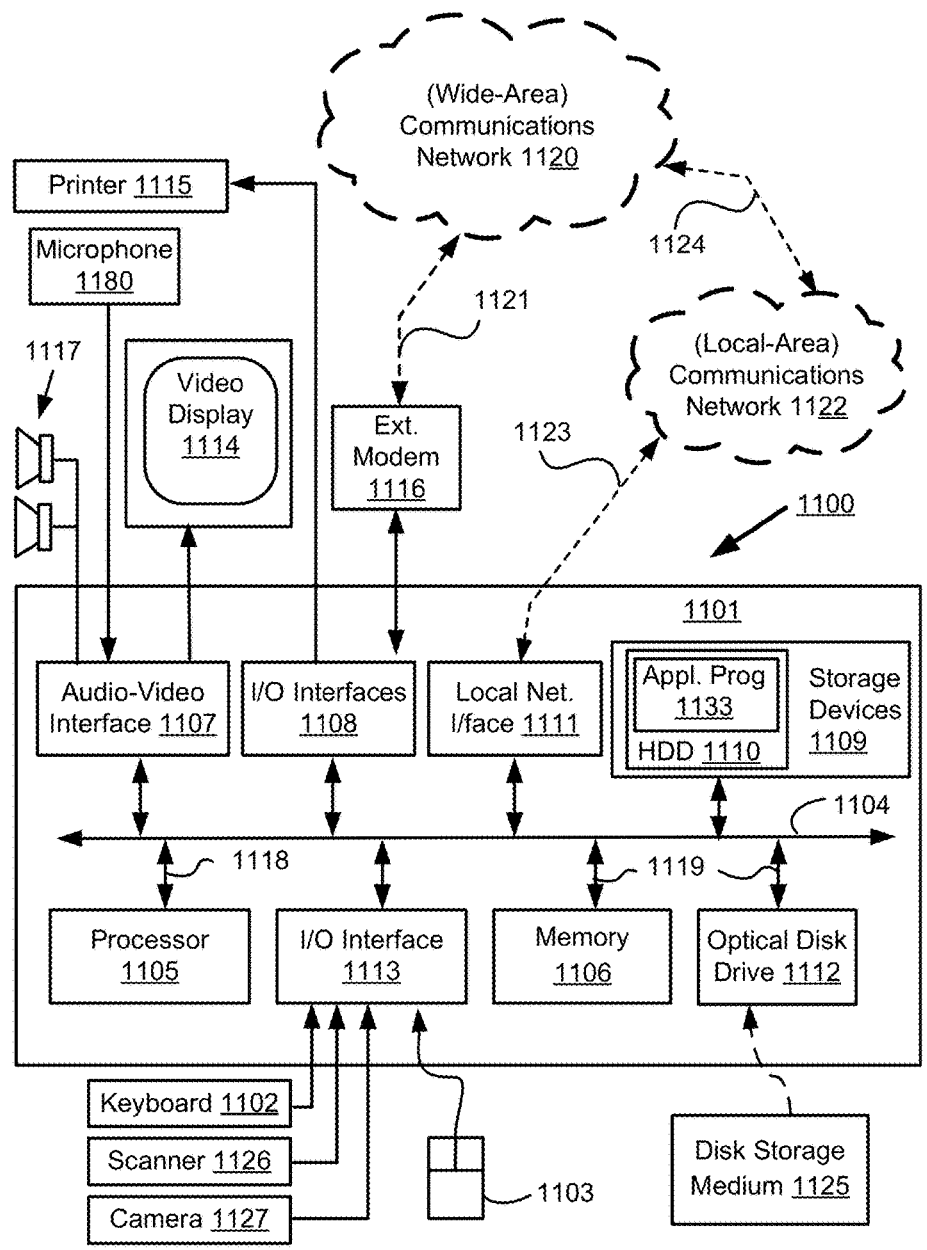
FIGS. 11A and 11B form a schematic block diagram of a general purpose computer system upon which arrangements described can be practiced.
Figure 11B:
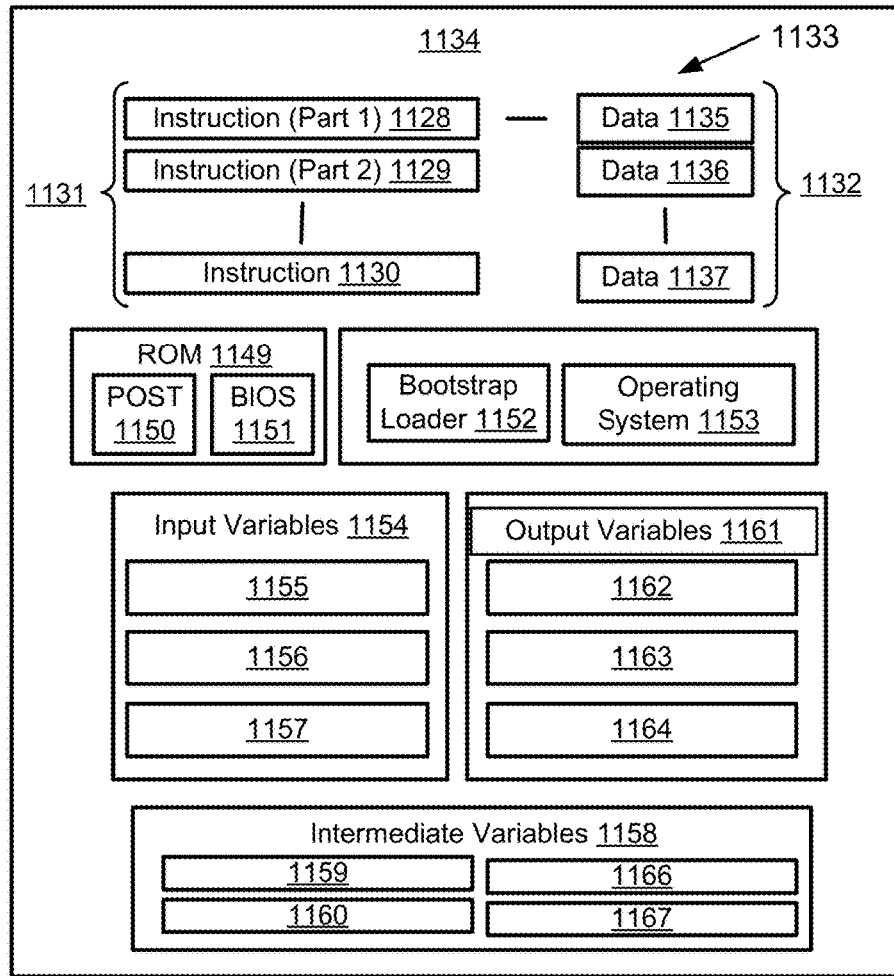
Figure 11B:
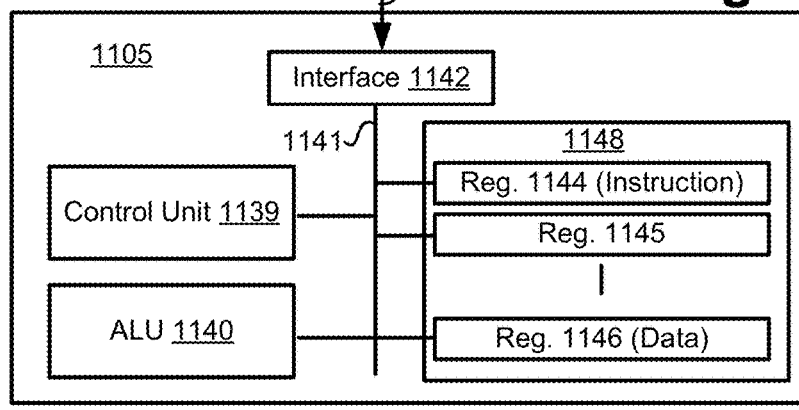

FIGS. 11A and 11B depict a general-purpose computer system 1100, upon which the various arrangements described can be practiced.

As seen in FIG. 11A, the computer system 1100 includes: a computer module 1101; input devices such as a keyboard 1102, a mouse pointer device 1103, a scanner 1126, a camera 1127, and a microphone 1180; and output devices including a printer 1115, a display device 1114 and loudspeakers 1117. An external Modulator-Demodulator (Modem) transceiver device 1116 may be used by the computer module 1101 for communicating to and from a communications network 1120 via a connection 1121. The communications network 1120 may be a wide-area network (WAN), such as the Internet, a cellular telecommunications network, or a private WAN. Where the connection 1121 is a telephone line, the modem 1116 may be a traditional "dial-up" modem. Alternatively, where the connection 1121 is a high capacity (e.g., cable) connection, the modem 1116 may be a broadband modem. A wireless modem may also be used for wireless connection to the communications network 1120. For cloud based arrangements, one or more servers 1190 may be connected the network 1120.

The computer module 1101 typically includes at least one processor unit 1105, and a memory unit 1106. For example, the memory unit 1106 may have semiconductor random access memory (RAM) and semiconductor read only memory (ROM). The computer module 1101 also includes an number of input/output (I/O) interfaces including: an audio-video interface 1107 that couples to the video display 1114, loudspeakers 1117 and microphone 1180; an I/O interface 1113 that couples to the keyboard 1102, mouse 1103, scanner 1126, camera 1127 and optionally a joystick or other human interface device (not illustrated); and an interface 1108 for the external modem 1116 and printer 1115. In some implementations, the modem 1116 may be incorporated within the computer module 1101, for example within the interface 1108. The computer module 1101 also has a local network interface 1111, which permits coupling of the computer system 1100 via a connection 1123 to a local-area communications network 1122, known as a Local Area Network (LAN). As illustrated in FIG. 11A, the local communications network 1122 may also couple to the wide network 1120 via a connection 1124, which would typically include a so-called "firewall" device or device of similar functionality. The local network interface 1111 may comprise an Ethernet circuit card, a Bluetooth® wireless arrangement or an IEEE 802.11 wireless arrangement; however, numerous other types of interfaces may be practiced for the interface 1111.

The I/O interfaces 1108 and 1113 may afford either or both of serial and parallel connectivity, the former typically being implemented according to the Universal Serial Bus (USB) standards and having corresponding USB connectors (not illustrated). Storage devices 1109 are provided and typically include a hard disk drive (HDD) 1110. Other storage devices such as a floppy disk drive and a magnetic tape drive (not illustrated) may also be used. An optical disk drive 1112 is typically provided to act as a non-volatile source of data. Portable memory devices, such optical disks (e.g., CD-ROM, DVD, Blu ray Disc™), USB-RAM, portable, external hard drives, and floppy disks, for example, may be used as appropriate sources of data to the system 1100.

The components 1105 to 1113 of the computer module 1101 typically communicate via an interconnected bus 1104 and in a manner that results in a conventional mode of operation of the computer system 1100 known to those in the relevant art. For example, the processor 1105 is coupled to the system bus 1104 using a connection 1118. Likewise, the memory 1106 and optical disk drive 1112 are coupled to the system bus 1104 by connections 1119. Examples of computers on which the described arrangements can be practised include IBM-PC's and compatibles, Sun Sparcstations, Apple Mac™ or a like computer systems.

The described methods may be implemented using the computer system 1100 wherein the processes of FIGS. 1 to 10, to be described, may be implemented as one or more software application programs 1133 executable within the computer system 1100. In particular, the steps of the described methods are effected by instructions 1131 (see FIG. 11B) in the software 1133 that are carried out within the computer system 1100. The software instructions 1131 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software 1133 is typically stored in the HDD 1110 or the memory 1106. The software is loaded into the computer system 1100 from the computer readable medium, and then executed by the computer system 1100. Thus, for example, the software 1133 may be stored on an optically readable disk storage medium (e.g., CD-ROM) 1125 that is read by the optical disk drive 1112. A computer readable medium having such software or computer program recorded on the computer readable medium is a computer program product. The use of the computer program product in the computer system 1100 preferably effects an advantageous apparatus for implementing the described methods.

In some instances, the application programs 1133 may be supplied to the user encoded on one or more CD-ROMs 1125 and read via the corresponding drive 1112, or alternatively may be read by the user from the networks 1120 or 1122. Still further, the software can also be loaded into the computer system 1100 from other computer readable media. Computer readable storage media refers to any non-transitory tangible storage medium that provides recorded instructions and/or data to the computer system 1100 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 1101. Examples of transitory or non-tangible computer readable transmission media that may also participate in the provision of software, application programs, instructions and/or data to the computer module 1101 include radio or infra-red transmission channels as well as a network connection to another computer or networked device, and the Internet or Intranets including e-mail transmissions and information recorded on Websites and the like.

The second part of the application programs 1133 and the corresponding code modules mentioned above may be executed to implement one or more graphical user interfaces (GUIs) to be rendered or otherwise represented upon the display 1114. Through manipulation of typically the keyboard 1102 and the mouse 1103, a user of the computer system 1100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1117 and user voice commands input via the microphone 1180.

FIG. 11B is a detailed schematic block diagram of the processor 1105 and a "memory" 1134. The memory 1134 represents a logical aggregation of all the memory modules (including the HDD 1109 and semiconductor memory 1106) that can be accessed by the computer module 1101 in FIG. 11A.

When the computer module 1101 is initially powered up, a power-on self-test (POST) program 1150 executes. The POST program 1150 is typically stored in a ROM 1149 of the semiconductor memory 1106 of FIG. 11A. A hardware device such as the ROM 1149 storing software is sometimes referred to as firmware. The POST program 1150 examines hardware within the computer module 1101 to ensure proper functioning and typically checks the processor 1105, the memory 1134 (1109, 1106), and a basic input-output systems software (BIOS) module 1151, also typically stored in the ROM 1149, for correct operation. Once the POST program 1150 has run successfully, the BIOS 1151 activates the hard disk drive 1110 of FIG. 11A. Activation of the hard disk drive 1110 causes a bootstrap loader program 1152 that is resident on the hard disk drive 1110 to execute via the processor 1105. This loads an operating system 1153 into the RAM memory 1106, upon which the operating system 1153 commences operation. The operating system 1153 is a system level application, executable by the processor 1105, to fulfil various high level functions, including processor management, memory management, device management, storage management, software application interface, and generic user interface.

The operating system 1153 manages the memory 1134 (1109, 1106) to ensure that each process or application running on the computer module 1101 has sufficient memory in which to execute without colliding with memory allocated to another process. Furthermore, the different types of memory available in the system 1100 of FIG. 11A must be used properly so that each process can run effectively. Accordingly, the aggregated memory 1134 is not intended to illustrate how particular segments of memory are allocated (unless otherwise stated), but rather to provide a general view of the memory accessible by the computer system 1100 and how such is used.

As shown in FIG. 11B, the processor 1105 includes a number of functional modules including a control unit 1139, an arithmetic logic unit (ALU) 1140, and a local or internal memory 1148, sometimes called a cache memory. The cache memory 1148 typically include a number of storage registers 1144-1146 in a register section. One or more internal busses 1141 functionally interconnect these functional modules. The processor 1105 typically also has one or more interfaces 1142 for communicating with external devices via the system bus 1104, using a connection 1118. The memory 1134 is coupled to the bus 1104 using a connection 1119.

The application program 1133 includes a sequence of instructions 1131 that may include conditional branch and loop instructions. The program 1133 may also include data 1132 which is used in execution of the program 1133. The instructions 1131 and the data 1132 are stored in memory locations 1128, 1129, 1130 and 1135, 1136, 1137, respectively. Depending upon the relative size of the instructions 1131 and the memory locations 1128-1130, a particular instruction may be stored in a single memory location as depicted by the instruction shown in the memory location 1130. Alternately, an instruction may be segmented into a number of parts each of which is stored in a separate memory location, as depicted by the instruction segments shown in the memory locations 1128 and 1129.

In general, the processor 1105 is given a set of instructions which are executed therein. The processor 1105 waits for a subsequent input, to which the processor 1105 reacts to by executing another set of instructions. Each input may be provided from one or more of a number of sources, including data generated by one or more of the input devices 1102, 1103, data received from an external source across one of the networks 1120, 1102, data retrieved from one of the storage devices 1106, 1109 or data retrieved from a storage medium 1125 inserted into the corresponding reader 1112, all depicted in FIG. 11A. The execution of a set of the instructions may in some cases result in output of data. Execution may also involve storing data or variables to the memory 1134.

The disclosed arrangements use input variables 1154, which are stored in the memory 1134 in corresponding memory locations 1155, 1156, 1157. The disclosed arrangements produce output variables 1161, which are stored in the memory 1134 in corresponding memory locations 1162, 1163, 1164. Intermediate variables 1158 may be stored in memory locations 1159, 1160, 1166 and 1167.

Referring to the processor 1105 of FIG. 11B, the registers 1144, 1145, 1146, the arithmetic logic unit (ALU) 1140, and the control unit 1139 work together to perform sequences of micro-operations needed to perform "fetch, decode, and execute" cycles for every instruction in the instruction set making up the program 1133. Each fetch, decode, and execute cycle comprises:

a fetch operation, which fetches or reads an instruction 1131 from a memory location 1128, 1129, 1130;

a decode operation in which the control unit 1139 determines which instruction has been fetched; and an execute operation in which the control unit 1139 and/or the ALU 1140 execute the instruction.

Thereafter, a further fetch, decode, and execute cycle for the next instruction may be executed. Similarly, a store cycle may be performed by which the control unit 1139 stores or writes a value to a memory location 1132.

Each step or sub-process in the processes of FIGS. 1 to 10 is associated with one or more segments of the program 1133 and is performed by the register section 1144, 1145, 1147, the ALU 1140, and the control unit 1139 in the processor 1105 working together to perform the fetch, decode, and execute cycles for every instruction in the instruction set for the noted segments of the program 1133.

The described methods may alternatively be implemented in dedicated hardware such as one or more integrated circuits performing the functions or sub functions of the described methods. Such dedicated hardware may include graphic processors, digital signal processors, or one or more microprocessors and associated memories.

Figure 1:
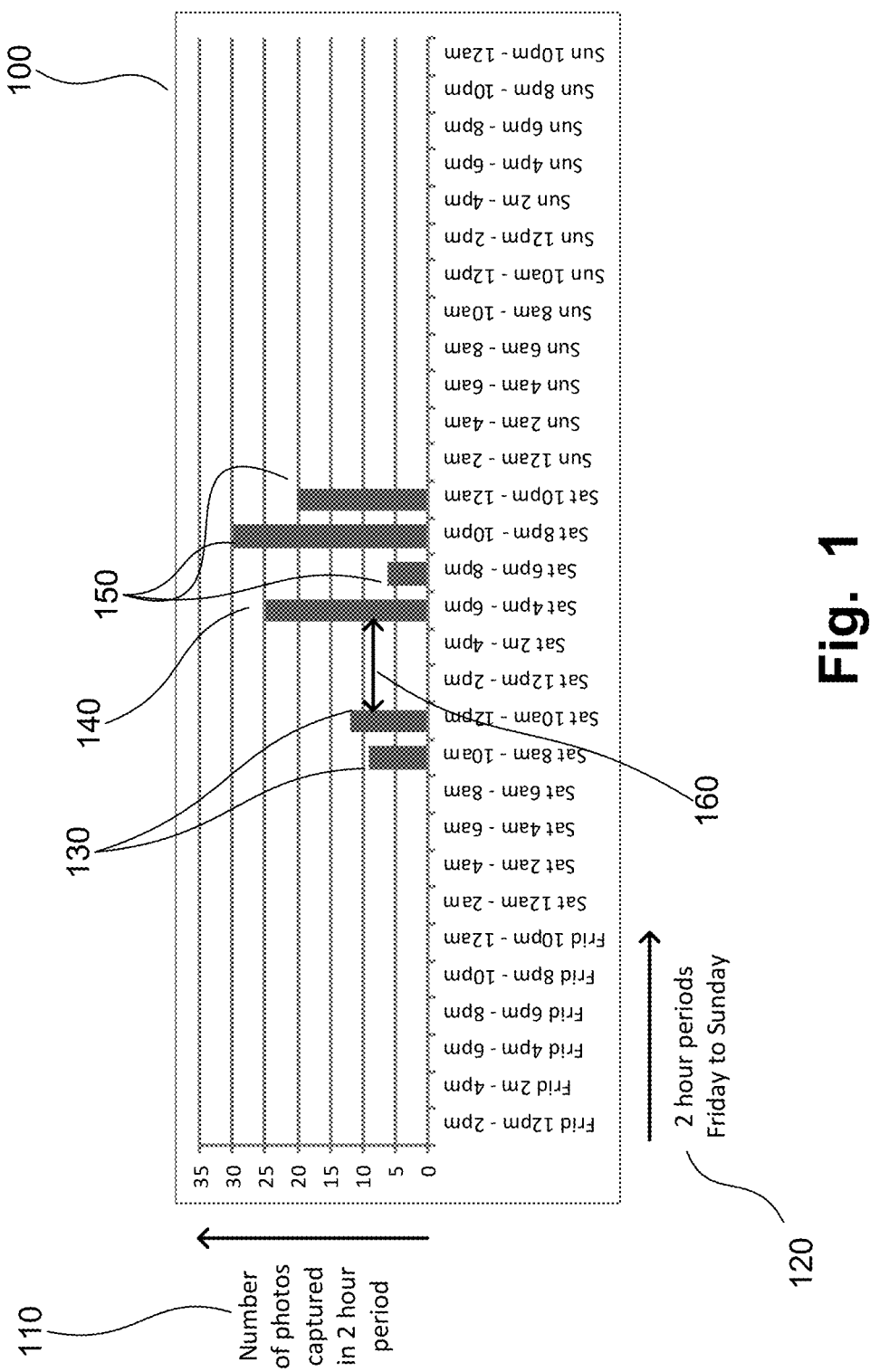
FIG. 1 shows an example of an image capture pattern related to two events occurring on a Saturday.
Figure 2:
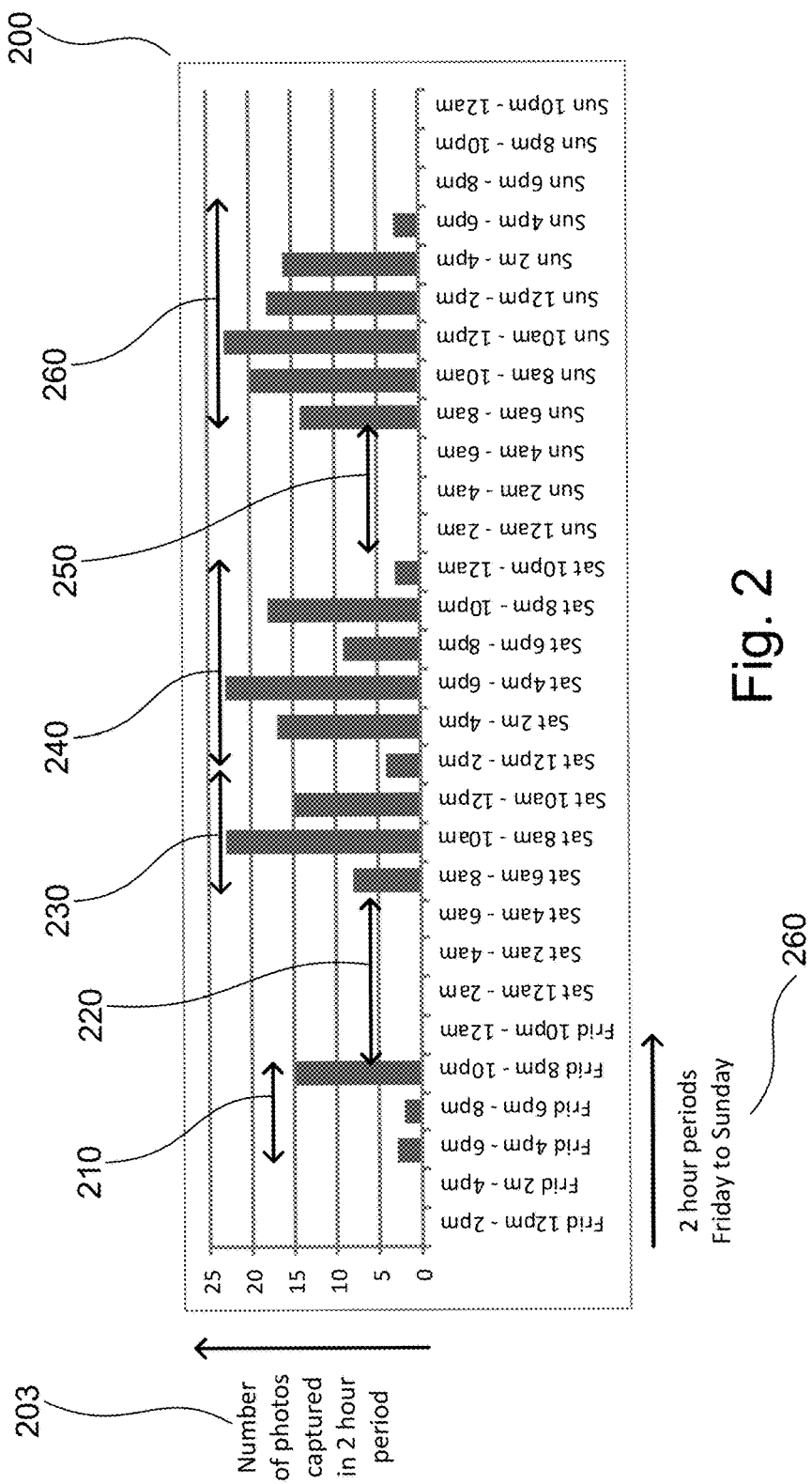
FIG. 2 shows an example of an image capture pattern related to a weekend trip.

FIG. 1 and FIG. 2 are two examples of image capturing patterns. FIG. 1 is a graph 100 showing an image capture pattern for two events that occur on a Saturday morning and Saturday evening. Axis 120 indicates two (2) hour periods and axis 110 represent the number of images captured in a particular two (2) hour period. In the period Saturday 8 am to Saturday 12 pm 130, twenty (20) images are captured followed by a gap representing a time interval of at least four (4) hours 160 to the images captured in the period Saturday 4 pm to 12 am 150.

FIG. 2 is a graph 200 showing an image capture pattern for a weekend trip event. As seen in FIG. 2, image capturing activity occurred on Friday evening 210, Saturday 230, 240 and Sunday 260. There is a gap 220 from Friday 10 pm to Saturday 6 am and a gap 250 between Saturday 12 am to Sunday 6 am. The gap 220 represents a time interval of at least eight (8) hours and gap 250 represents a time interval of at least six (6) hours. The two gaps 220 and 250 are mostly likely to relate to the time period within which the photographer was sleeping. Both gaps 220 and 250 are larger than the gap 160 in FIG. 1 of four (4) hours.

The methods described below may be used to not segment the single weekend trip event of FIG. 2 while segmenting the images of FIG. 1 into morning and evening event.

Additional modifications to the time gap sequence may be used to improve recognition of more specific multi-day events such as weekend trips and holiday trips.

Figure 3:
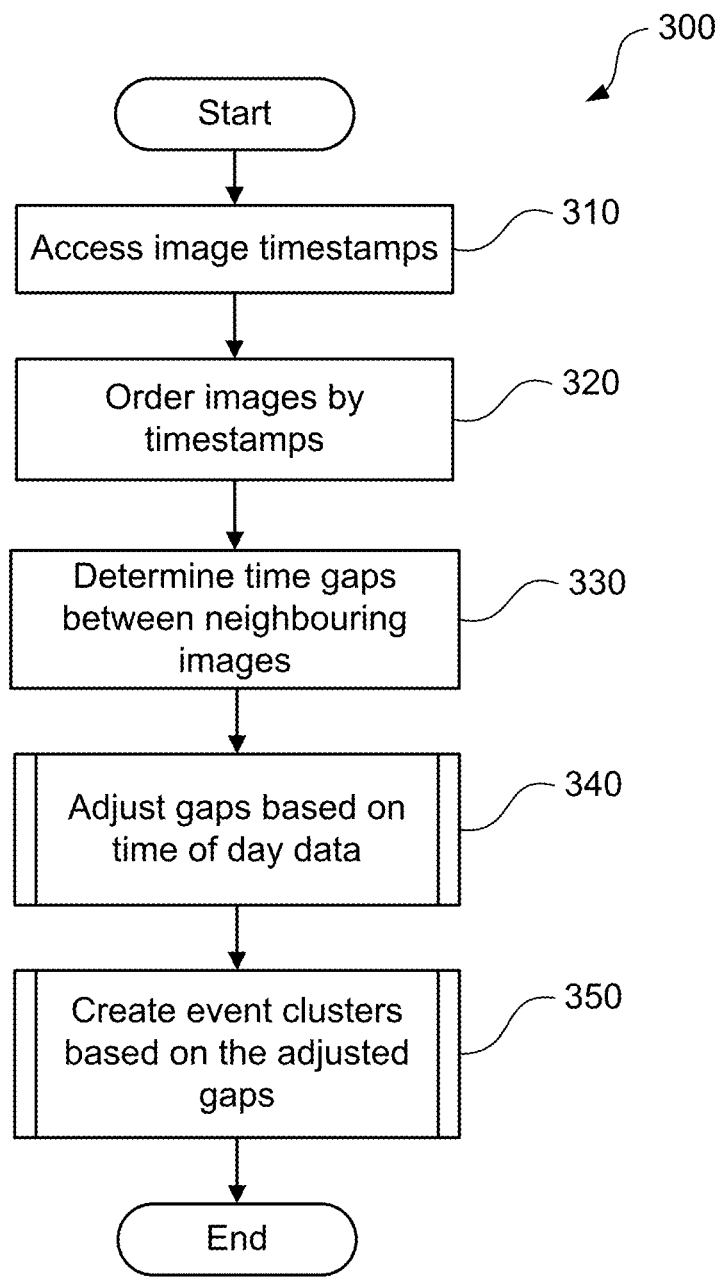
FIG. 3 is a schematic flow diagram showing a method of segmenting an image set to generate a plurality of event clusters.

A method 300 of segmenting an image set to generate a plurality of event clusters, is described below with reference to FIG. 3. As described, each event cluster includes at least one image from the image set. The method 300 may be implemented as one or more software code modules of the software application program 1133 resident on the hard disk drive 1110 and being controlled in its execution by the processor 1105. The method 300 is described by way of example with reference to an example image set 410 seen in FIG. 4, where the image set 410 is configured within the storage device 1109.

The method 300 begins at accessing step 310, where timestamps, corresponding to images in the image set, are accessed under execution of the processor 1105. Each image in the image set can have a timestamp associated with the image, where the timestamp indicates the time of capture of the image. The timestamp may be recorded in metadata attributes, such as exchangeable image file format (EXIF) data embedded in the digital file for the image. Such timestamps may be referred to as "image metadata" or "time metadata". In another arrangement, the time of capture of an image may be recorded separately from the digital file for the image (e.g. in a database). In a further arrangement, the image file creation time may be interpreted as the image capture time.

The timestamp may be converted into a number of different formats for storage and manipulation by software systems. Any suitable format for storing and manipulating timestamps, including a Unix time stamp, a date and time string, or a software class such as the Java Calendar class, may be used in the method 300. Any suitable method for determining the time difference between two timestamps may also be used in the method 300 to determine the date and time of day from a stored timestamp.

The method 300 then proceeds from step 310 to ordering step 320, where the images in the image set are ordered according to the timestamps associated with each of the images. Step 320 results in an "ordered timestamp list". The ordered timestamp list may be stored in the memory 1106 by the processor 1105.

Figure 4:
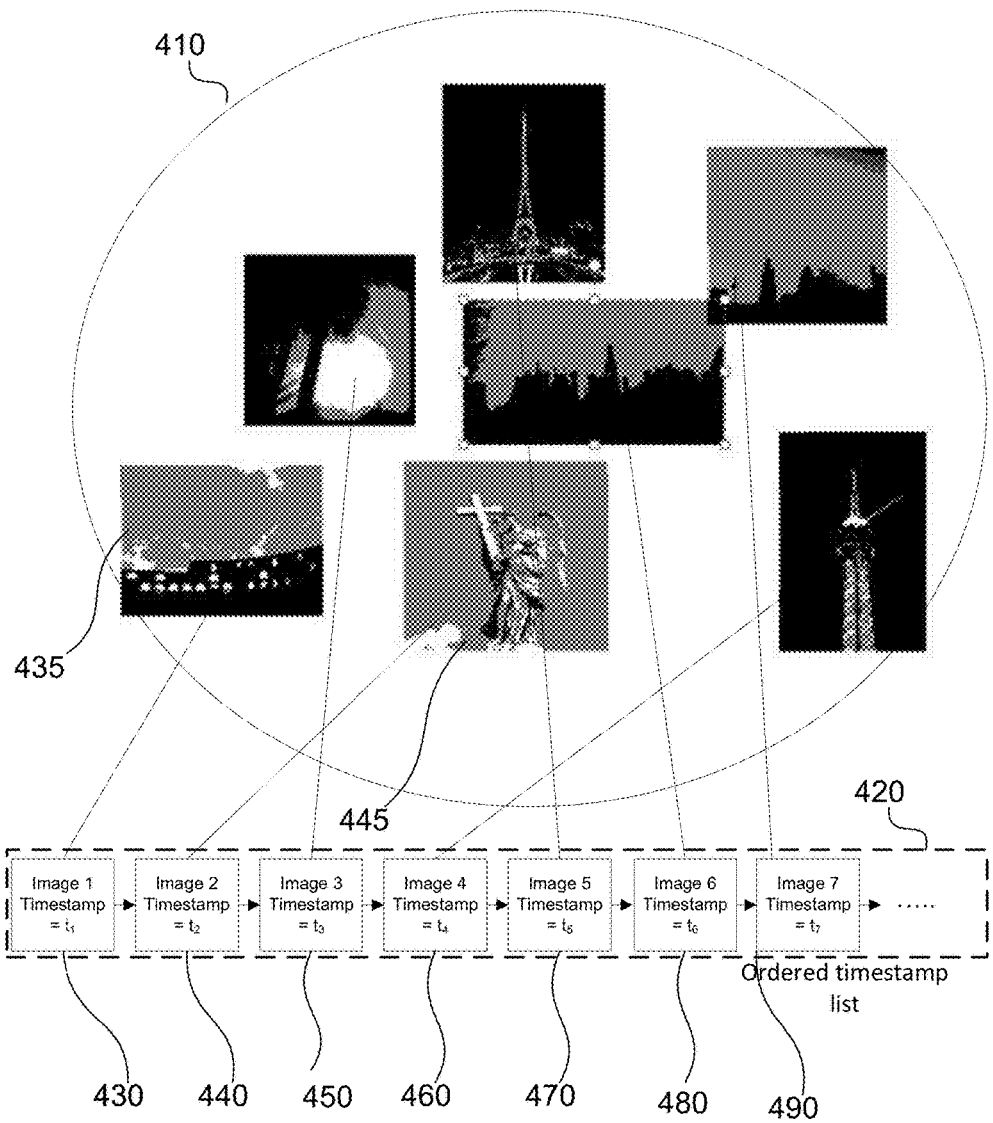
FIG. 4 shows a sequence of images ordered by timestamps as used in the method of FIG. 3.

FIG. 4 shows the example ordered timestamp list 420. As seen in FIG. 4, the ordered timestamp list 420 comprises timestamp list elements 430, 440 450, 460, 470, 480 and 490. Each of the timestamp list elements 430, 440, 450, 460, 470, 480 and 490 relate to an image (or "photo") of the image set 410. The timestamp list 420 is ordered based on the timestamps 430, 440 450, 460, 470, 480 and 490 such that, for example, the timestamp list element 430 for image 435 has a value less than or equal to the timestamp for the timestamp list element 440 for image 445. That is $t_1$ of timestamp list element $430 \le t_2$ for timestamp list element 440. The ordered timestamp list 420 is one example of many possible methods of representing the timestamps of a set of images.

Following step 320, the method 300 proceeds to determining step 330, where time gaps representing time intervals between each pair of neighbouring (i.e., successive) images (e.g., images 435 and 440) in the image set 410 are determined under execution of the processor 1105. The neighbouring images in each of the pairs are adjacent in a time ordered sequence. The time gap representing the time interval between each of the pairs of images is determined from the time metadata associated with each image in the pair.

Figure 5:
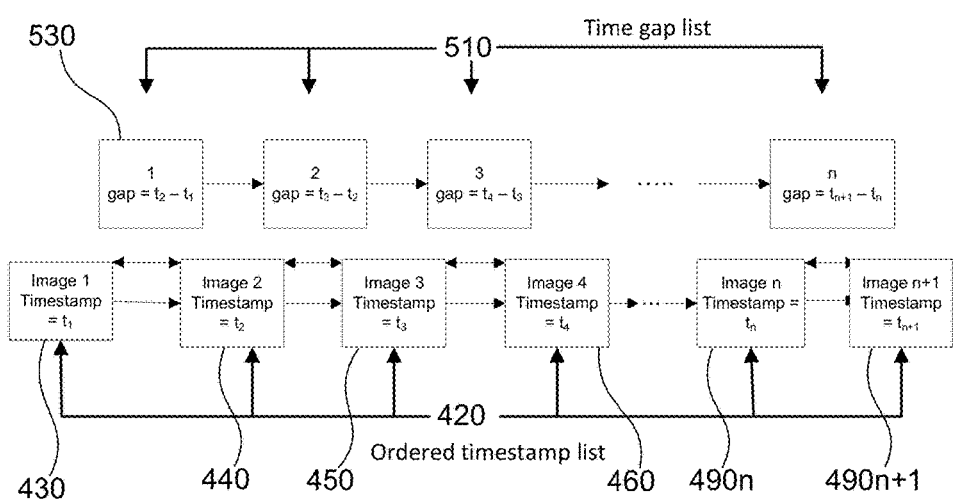
FIG. 5 shows the sequence of images of FIG. 4 and the time gaps between successive images.

The time gaps determined at step 330 are stored in a "time gap list" 510 as seen in FIG. 5 configured, for example, within the memory 1106. Referring to FIG. 5, the time gap list 510 is determined from the ordered timestamp list 420. In the example of FIG. 5, time gap list element 530 has a gap=$t_2-t_1$ where $t_1$ is the timestamp of timestamp list element 430 for image 435 and $t_2$ is the timestamp for timestamp list element 440 for image 445.

Figure 6:
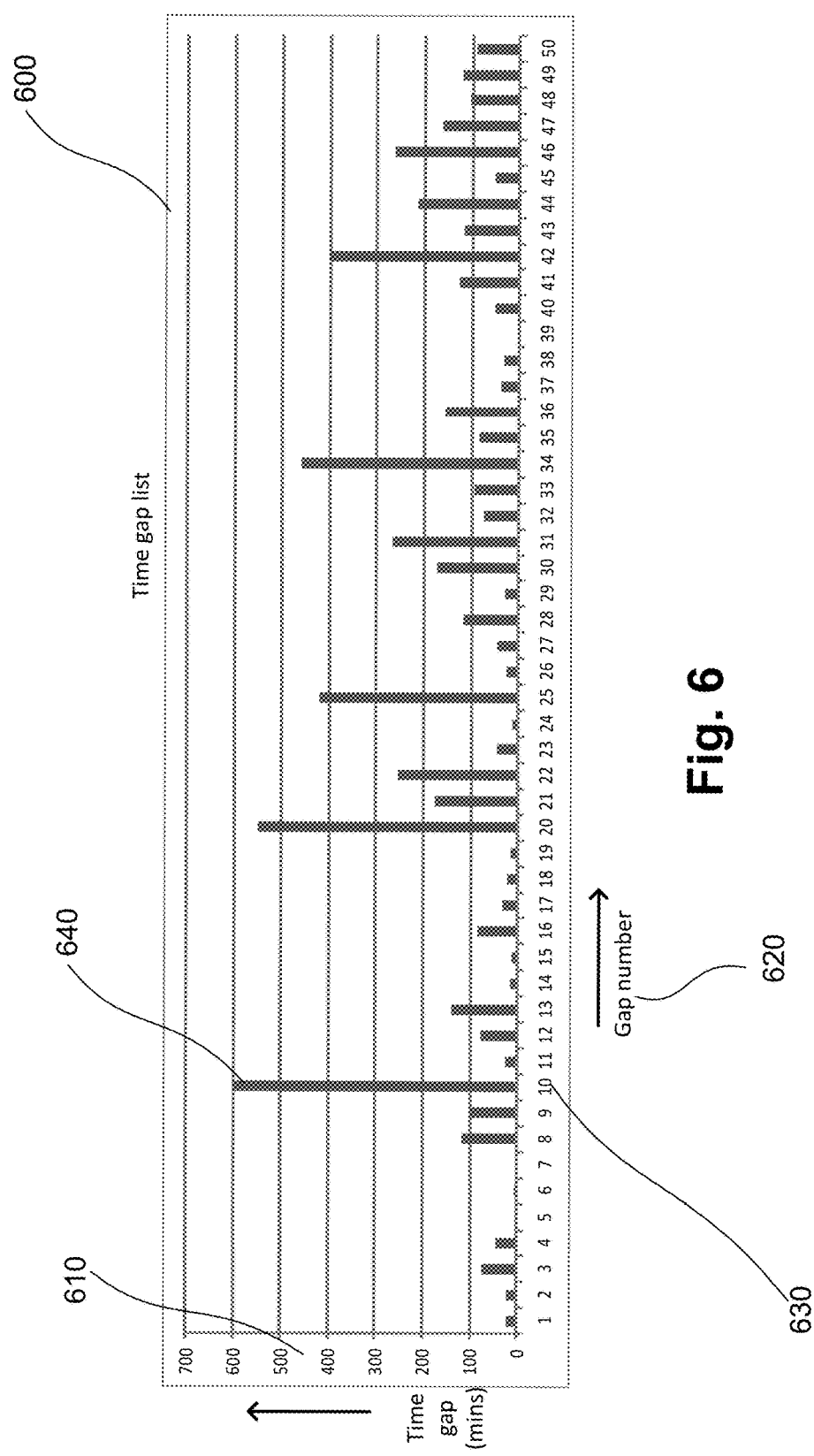
FIG. 6 shows a time gap sequence which is the sequence of time differences between successive images.

FIG. 6 shows a graphical example of a time gap list 600 for an image set comprising fifty-one (51) images. Axis 620 is the gap number while axis 610 is the time gap in minutes. For example, gap number ten (10) 630 corresponds to the gap representing a time interval between images ten (10) and eleven (11) and shows that there was a time interval (or time period) of six hundred (600) minutes 640 between the capture of image ten (10) and image (11). The time gap list 600 is one example of many possible methods of representing the time gaps between successive images.

The method 300 then proceeds from step 330 to adjusting step 340, where the time gaps determined at step 330 are adjusted under execution of the processor 1105. As described below, the time gaps may be adjusted at step 340 based on an adjustment value determined for one or more of the time gaps (or time intervals) based on at least one of predetermined time of day information and calendar information. The adjustment of the time gaps at step 340 modifies the time gap list by making use of the time gap list and the ordered timestamp list. A method 700 of adjusting time gaps, as executed at step 340, will be further described below with reference to FIG. 7.

The method 300 then proceeds to creating step 350, where event clusters are created using the adjusted time gaps. A method 1000 of creating event clusters, as executed at step 350, will be described in detail below with reference to FIG. 10. In accordance with the method 1000, the event clusters are created by comparing time intervals represented by gaps to the time extent of clusters. As described in detail below, the method 1000 is configured for segmenting the images in the image set (e.g., image set 420) to generate one or more event clusters. In one arrangement, a plurality of event clusters may be determined. Segmentation boundaries for each event cluster may be determined using the adjustment values determined at step 340.

Another method 900 of creating event clusters, which may be executed at step 350, will also be described below.

Figure 7:
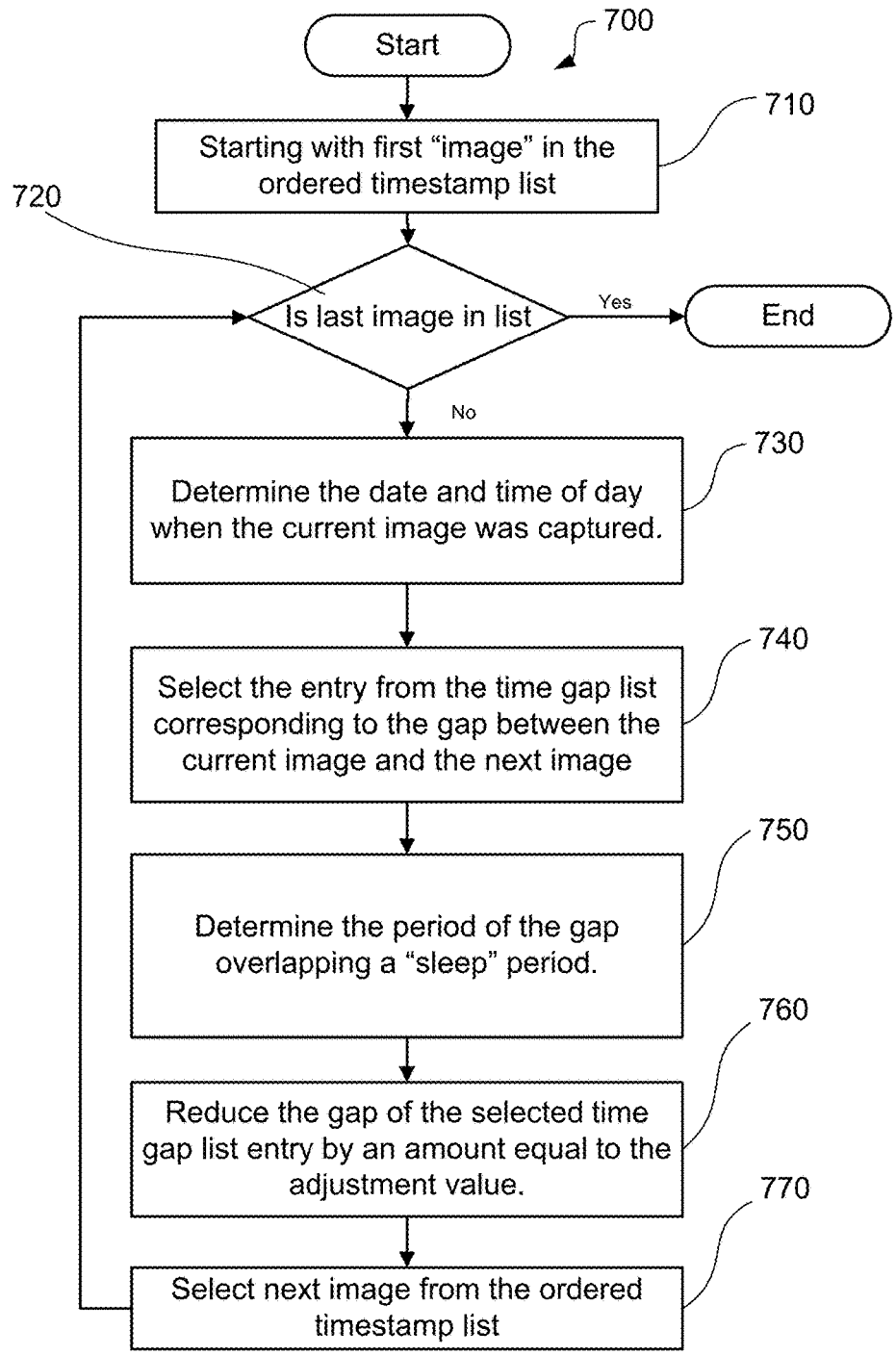
FIG. 7 is a schematic flow diagram showing a method of adjusting time gaps as used in the method of FIG. 3.

The method 700 of adjusting time gaps, as executed at step 340, will now be described further by way of example with reference to FIG. 7. The method 700 may be implemented as one or more software code modules of the software application program 1133 resident on the hard disk drive 1110 and being controlled in its execution by the processor 1105. As seen in FIG. 7, in the method 700 a loop is implemented in which software functions are called to implement the steps 730, 740, 750, and 760. In an alternative arrangement, the time gaps may be adjusted by increasing the time gaps during a "non-sleeping" period.

The method 700 will be described by way of example with reference to the example timestamp list 420 of FIG. 4. The method 700 begins at accessing step 710, where the first timestamp list element 430 of the timestamp list 420 is accessed (e.g., from the hard disk drive 1110) under execution of the processor 1105. As seen in FIG. 4, the first timestamp list element 430 is related to the first image 435 in the image set 410.

In accordance with the method 700, steps 730, 740, 750, and 760 are repeated for all but the last timestamp element of the ordered timestamp list 420. Accordingly, at decision step 720, if the timestamp element is the last timestamp element of the ordered time stamp list 420 (i.e., corresponding to the last image of the image set 410) to be processed, then the method 780 concludes. Otherwise, the method 700 proceeds to determining step 730.

In the first loop of the method 700, at determining step 730, the date and time of day corresponding to the timestamp of the timestamp element 430 is determined. As described above, the first timestamp list element 430 is related to the first image 435 in the image set 410. In this instance, the image 435 may be referred to as the "current image" (i.e., the image currently being processed). Accordingly, the date and time of day determined at step 730 is the data and time of day at which the current image was captured. In some arrangements, the timestamp is stored in date and time of day format in which case no processing is required at step 730. Otherwise, if the timestamp is stored in other formats any suitable method of determining the date and time of day from the timestamp may be used at step 730.

Then at selecting step 740, the gap 530 in the time gap list 510 corresponding to the timestamp element 430 and the next timestamp element 440 is selected under execution of the processor 1105. In the example of FIG. 4, the timestamp element 430 corresponds to the image 435 (i.e., the current image) and the timestamp element 440 corresponds to the image 445 (i.e., the next image).

The method 700 continues at the next determining step 750, where a proportion of the selected gap 530 overlapping a "sleep" period is determined under execution of the processor 1105. The proportion determined at step 750 may be referred to as an adjustment value. The adjustment value is determined based on the overlap of the time interval represented by the proportion of the selected gap 530 and the sleep period (i.e., a time of day period). Then at reducing step 760, the selected gap 530 is reduced by an amount equal to the proportion (i.e., the adjustment value) of the adjustment value determined at step 750.

The method 700 proceeds from step 760 to selecting step 770, where the next timestamp element 440 in the ordered timestamp list 420 corresponding to the image 445 (i.e., the next image) is selected under execution of the processor 1105. Following step 770, the method 700 returns to step 720.

Figure 8:
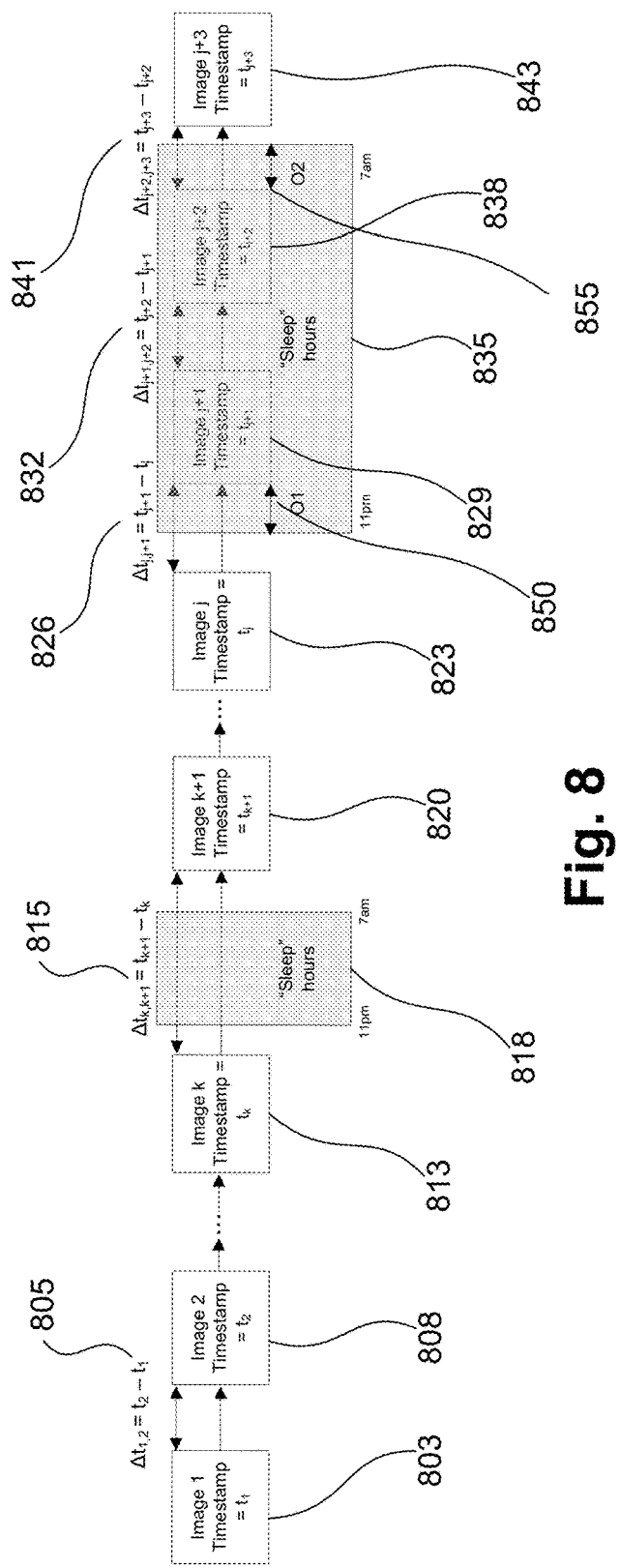
FIG. 8 shows an example of adjusting gaps in accordance with the method of FIG. 7.

The gap adjustment performed at steps 750 and 760 will be described in more detail below by way of example with reference to FIG. 8. As described above, the adjustment of a gap is performed at steps 750 and 760 to reduce the gap when the gap overlaps with a time of day period corresponding to "expected sleeping hours". In the example of FIG. 8, the expected sleeping hours are predetermined and set to be between 11 pm on one day to 7 am on the following day. The expected sleeping hours of FIG. 8 are fixed, repeated daily and correspond to expected sleeping hours of the general population. Alternative sleeping hour periods may be used. For example the expected sleeping hours may vary from country to country. The sleeping hour periods may also vary over time with people having different sleeping patterns during summer months and winter months. This means that within a given image set, different expected sleeping hours may apply.

In an alternative arrangement, rather than reducing the gaps that do overlap sleeping hours as at step 350, the gaps that do not overlap sleeping hours may be increased. An adjustment value may be determined based on the non-overlap of the time interval and the sleep period (i.e., a time of day period). Increasing the gaps that do not overlap sleeping hours has the same effect as reducing the gaps that do overlap sleeping hours. Consequently, only arrangements that reduce the gaps that do overlap sleeping hours, as at step 350, are described below.

In the example of FIG. 8, two images 803 and 808 are captured during the same day close to the middle of the day. Gap 805 does not overlap the expected sleeping hours and so there will be no adjustment to gap 805. Two images "k" 813 with timestamp $t_k$ and "k+1" 820 with timestamp $t_{k+1}$ are captured on successive days such that expected sleeping hours fall within gap $815=t_{k+1}-t_k$. The gap 815>8 hours which is the duration of the expected sleeping hours in the example of FIG. 8. In the example of FIG. 8, the gap 815 is reduced by a proportion of the duration of the expected sleeping hours in accordance with Equation (1), as follows:

$$\text{new gap} = \text{old gap} - (\alpha * o) \quad (1)$$

where $0<\alpha\leq1$ and o is the period of overlap of the old gap and the expected sleeping hours.

Other arrangements for determining adjustment values for adjusting gaps may be used. In one alternate arrangement, the gap may be reduced using an alternate function to the simple ratio α applied to the overlap. For example, a logarithmic function may be used to determine the gap reduction at steps 750 and 760.

Images "j+1" 829 and "j+2" 838 are captured within the expected sleeping hours. According to Equation (1), the gap 826 is adjusted to become $(t_{j+1}-t_j)-(\alpha*o1)$ where o1 850 is the overlap of the gap 826 with expected sleeping hours. Similarly gap 832 when adjusted becomes $(t_{j+2}-t_{j+1})-(\alpha*((t_{j+2}-t_{j+1})))$ and gap 841 when adjusted becomes $(t_{j+3}-t_{j+2})-(\alpha*o2)$, where o2 855 is the overlap of the gap 841 with the expected sleeping hours.

Accordingly, the gap adjustment can still be applied when images are being captured within the expected sleeping hours. Images captured at unusual hours typically indicate a singular intent meaning that the images should be considered to be of the same event and the images should not be segmented into different events which would occur if the gaps were not reduced. However, persistent image capturing in expected sleeping hours may indicate that the expected sleeping hours do not match the photographer's sleep pattern and an alternative arrangement may be used. For example, in one alternative arrangement only the largest of the two (2) gaps 826 and 841 are adjusted according to Equation (1).

Step 350 of creating event clusters will now be described further by way of example with reference to FIG. 9 and FIG. 10.

Figure 9:
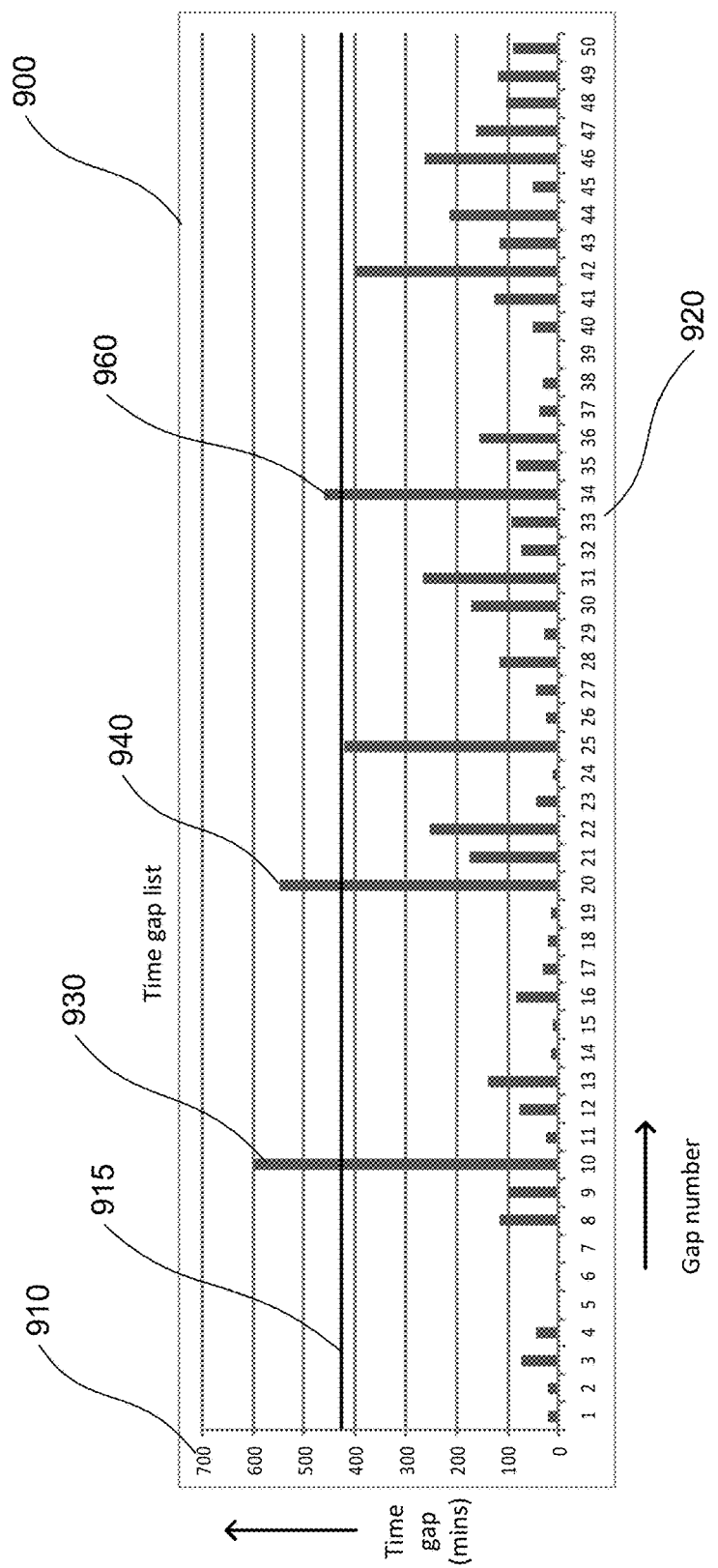
FIG. 9 shows an example of the clustering of images into events based on gap thresholds in accordance with the method of FIG. 3.
Figure 10:
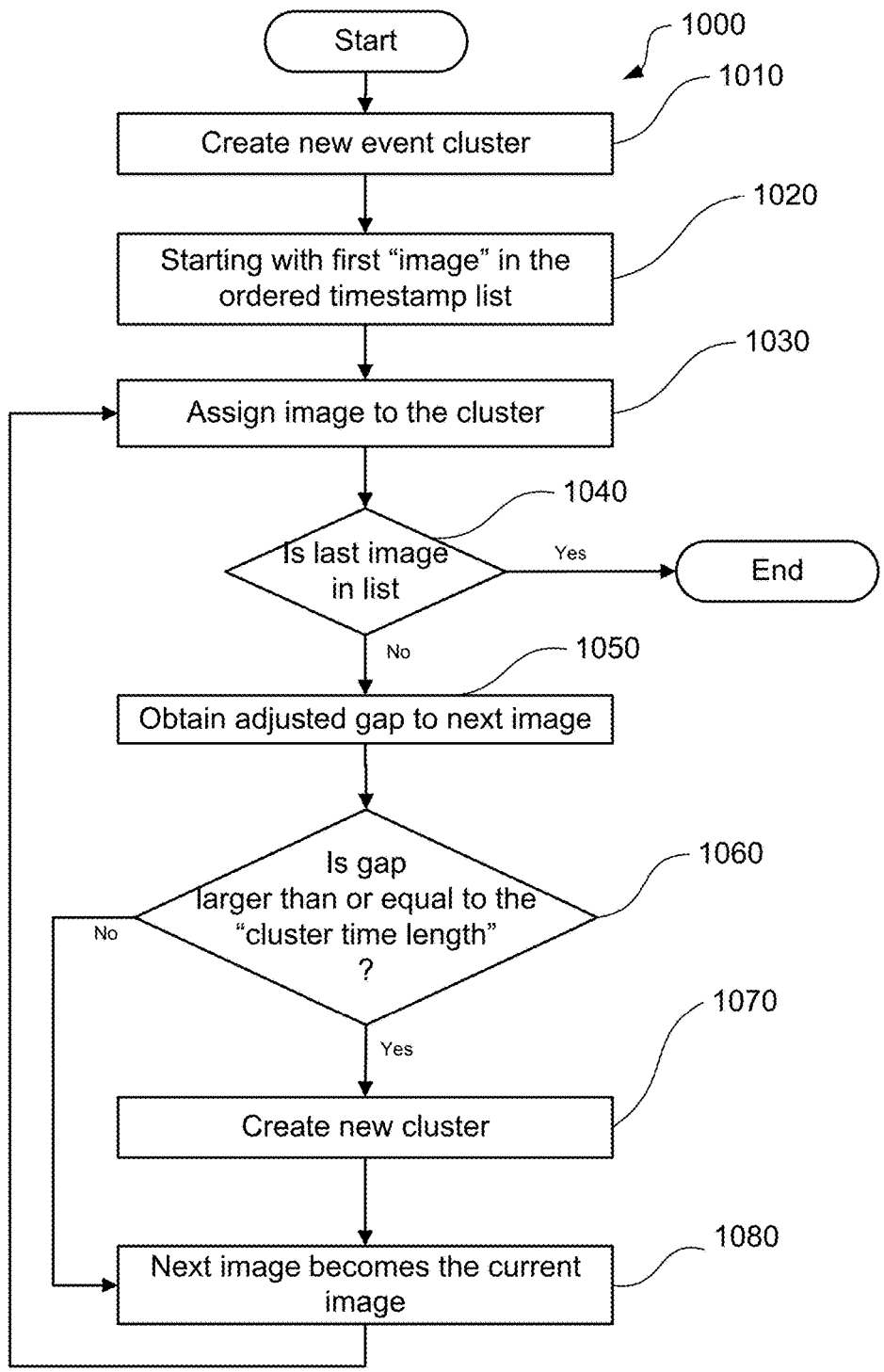
FIG. 10 is a schematic flow diagram showing a method of creating event clusters as used in the method of FIG. 3.

In the example of FIG. 9, a gap threshold is used for the creation of event clusters using the adjusted time gaps. Time gap list 900 has fifty (50) gaps corresponding to a set of fifty-one (51) images. Axis 920 represents the gap number while axis 910 represents the gap time in minutes. In the example of FIG. 9, a threshold 915 of value of four-hundred and thirty (430) minutes is used. Gaps greater or equal to four-hundred and thirty (430) minutes are considered to be breaks between events.

In the example of FIG. 9, there are three (3) gaps 930, 940 and 960 each representing time intervals which are greater or equal to four-hundred and thirty (430) minutes. As gap ten (10) 930 corresponds to the gap between images ten (10) and eleven (11), images one (1) to ten (10) inclusive form event one (1). Images one (1) to ten (10) represents a first segment of the set of fifty-one (51) images. Also images eleven (11) to twenty (20) inclusive form event two (2), so that images eleven (11) to twenty (20) represents a second segment of the set of fifty-one (51) images. Further, images twenty-one (21) to thirty-four (34) inclusive form event three (3) representing a third segment of the set of fifty-one (51) images. The remaining images forty-three (43) to fifty-one (51) form event four (4), representing a fourth segment of the set of fifty-one (51) images. The boundaries between each of the event clusters (or segments) are determined using the gap threshold.

The method 1000 of creating event clusters, as executed at step 350, will now be described with reference to FIG. 10. The method 1000 is an alternate arrangement of event clustering using adjusted time gaps. In the method 1000, gap threshold is not fixed but, within bounds, increases with the time duration of a cluster so far. The method 1000 is configured for assigning images to an event cluster based on a comparison of an adjusted time interval represented by an adjusted gap with a time interval associated with the even cluster.

The method 1000 is advantageous for a vacation where persistent image capturing over many days might be broken by a day when no images are captured for reasons such as sickness or a camera battery was not charged. It may also be desirable that the vacation is not broken into two events due to the large time gap and the method 1000 will be more likely to create a single event.

The method 1000 may be implemented as one or more software code modules of the software application program 1133 resident on the hard disk drive 1110 and being controlled in its execution by the processor 1105. The method 1000 will be described by way of example with reference to the ordered time list 420.

The method 1000 begins at creation step 1010, where an initial cluster is created and stored in the memory 1106 by the processor 1105. Then at selecting step 1020, the first image 435 of the image set 410 is selected as a current image. The image 435 is selected by selecting the timestamp list element 430 from the ordered timestamp list 420.

Steps 1030, 1040, 1050, 1060, 1070 and 1080 are executed for successive images in the ordered timestamp list 420. As seen in FIG. 10, in the method 1000, a loop is implemented in which software functions are called to implement the steps 1030, 1040, 1050, 1060, 1070 and 1080.

In a first loop, at assigning step 1030, the current image (i.e., image 435) is assigned to the current cluster.

Then at decision step 1040, the processor 1105 is used for checking for the last image in the ordered timestamp list 420 and when satisfied the method 1000 concludes. The last image corresponds to the last timestamp list element (e.g., timestamp list element 490). Otherwise, the time interval represented by the adjusted gap to the next image 445 is obtained at obtaining step 1050.

Then at decision step 1060, if the adjusted gap to the next image 445 is larger than or equal to the value of a "cluster time length" function, then the method 1000 proceeds to creating step 1070. The cluster time length is the time between the first image 435 in the current cluster and the current image representing the last image in the current cluster. In one arrangement, the cluster time length is equal to the accumulated sum of time intervals represented by the adjusted time gaps between the successive images in the ordered timestamp list 420. In an alternative arrangement, the cluster time length is equal to the timestamp difference between the first image in the cluster and the current image. The timestamp difference between the first image in the cluster and the current image is equivalent to the sum of the un-adjusted time gaps.

The test performed at step 1060 may be represented in accordance with Equation (2), as follows:

$$\text{adjusted time gap to next image} \geq \varphi(\text{cluster time length}) \quad (2)$$

where $\varphi$ in one arrangement is a monotonically increasing function defined by Equation (3), as follows:

$$\varphi = \alpha + \beta * \log(1 + (\text{cluster time length})/\gamma)$$

with the parameters $\alpha$, $\beta$, and $\gamma$ constants fixed.

Other arrangements of the cluster time length function $\varphi$ are possible including exponential, polynomial, and step functions.

At creating step 1070, a new event cluster is created. Then at next image step 1080, the method progresses to the next image 445 by selecting the timestamp list element 440 in the ordered timestamp list 420. The next image 445 becomes the current image for purposes of the method 1000. The method 1000 returns to step 1030 following step 1070.

In another arrangement, time gap adjustment is also used to influence the event clustering, where gap periods that coincide with expected sleeping hours on weekends, multi-day festivals, and recognised holiday periods results in better detection of weekend trips, festival trips, and vacations, are further reduced.

In one arrangement, all the steps 310, 320, 330 and 350 of the method 300 are performed as described above except for the adjustment of gaps at step 340. In such an arrangement, at step 750, expected sleeping hours that occur during weekends, multi-day festivals and recognised holiday periods are used to reduce the gap further at step 760. For example, the expected sleeping hours may be set to be between 11 pm on one day to 9 am on the following day where the following day is a recognised holiday. The time interval represented by a gap may be further reduced when an overlap period falls on a weekend, a holiday season or a multi-day festival.

The dates of such multi-day festivals and standard holiday periods change from year to year. For cloud based arrangements, a software calendar where the dates of multi-day festivals and standard holiday periods are stored can be updated when new multi-day festivals and recognised holiday periods dates are made public. For example, the software calendar may be stored on the server 1190. In other arrangements, which may be mobile based, the software program 1133 implementing the described methods may be updated by way of regular software upgrades. Where the software program 1133 is stored within the storage module 1109, the software program 1133 may be updated by software upgrades to add the new dates or the software program 1133 may be configured to request calendar updates from a cloud service.

In an arrangement that uses weekends, multi-day festivals and recognised holiday periods, the additional reduction to the time gap determined at step 750 is applied at step 760. In one arrangement, the gap may be further reduced by a predetermined amount of 10%.

In another arrangement, the further reduction may be applied to a selected subset of the three periods: weekends; multi-day festivals; and recognised holiday periods, at step 760.

In a further arrangement, additional periods that are personalised for a photographer may be identified for reduction. For example, a period such as a wedding anniversary, where the photographer is more likely to take a short holiday, may be identified for reduction. Another example is a period where the photographer has a history of taking vacations. The time interval represented by a gap as described above, may be further reduced if an overlap period corresponds with one or more of a period around the wedding anniversary of the photographer or a period where the photographer is expected to take a vacation. In such cases a personalised calendar may be used to store the personalised periods. The photographer may be required to explicitly provide the relevant information for the calendar. Some information in relation to the photographer may be obtained from other sources that could include social networks or a personal calendar in a device where the software program 1133 is being executed.

INDUSTRIAL APPLICABILITY

The arrangements described are applicable to the computer and data processing industries and particularly for the image processing.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A computer implemented method of segmenting an image set to generate a plurality of event clusters, each event cluster including at least one image from the image set, said method comprising:
   accessing, using one or more computer processors, the image set having time metadata corresponding to each image in the set;
   determining, using the one or more computer processors, a time interval between each pair of neighbouring images in the image set, the neighbouring images in each of said pairs being adjacent in a time ordered sequence, said time interval for each of said pairs being determined from time metadata associated with each image in the pair;
   determining, using the one or more computer processors, an adjustment value for one or more of the determined time intervals based on at least one of predetermined time of day information and calendar information, wherein the adjustment value is determined based on at least one of the group consisting of:
   overlap of the time interval and one or more predetermined date and time of day periods; and
   non-overlap of the time interval and one or more predetermined date and time of day periods; and
   segmenting, using the one or more computer processors, the images in the image set to generate the plurality of event clusters, wherein segmentation boundaries for each event cluster are determined using at least the determined adjustment value.

2. The method according to claim 1, wherein segmentation boundaries for each event cluster are determined using the determined time interval reduced by the adjustment value.

3. The method according to claim 1, wherein segmentation boundaries for each event cluster are determined using the determined time interval increased by the adjustment value.

4. The method according to claim 1, wherein the predetermined date and time of day period is fixed.

5. The method according to claim 2, wherein the predetermined date and time of day period is fixed, and wherein the determined time interval is further reduced when an overlap period falls on a weekend.

6. The method according to claim 2, wherein the predetermined date and time of day period is fixed, and wherein the determined time interval is further reduced when an overlap period falls on one or more of: a weekend; holiday season; multi-day festivals.

7. The method according to claim 2, wherein the predetermined date and time of day period is fixed, and wherein the determined time interval is further reduced when an overlap period corresponds with one or more of a period around the wedding anniversary of the photographer; a period where the photographer is expected to take a vacation.

8. The method according to claim 1, wherein the image set is ordered based on the time metadata representing image capture.

9. The method according to claim 1, wherein the time interval is an initial time interval.

10. The method according to claim 1, further comprising calculating an adjusted time interval from the adjustment time value of a determined time interval; and
   assigning an image to an event cluster based on a comparison of the adjusted time interval with an event time interval associated with the event cluster.

11. An apparatus for segmenting an image set to generate a plurality of event clusters, each event cluster including at least one image from the image set, said apparatus comprising:
   one or more computer processors; and
   one or more computer readable memories for storing instructions which, when executed, cause the one or more computer processors to perform operations of:
   accessing the image set having time metadata corresponding to each image in the set;
   determining a time interval between each pair of neighbouring images in the image set, the neighbouring images in each of said pairs being adjacent in a time ordered sequence, said time interval for each of said pairs being determined from time metadata associated with each image in the pair;
   determining an adjustment value for one or more of the determined time intervals based on at least one of predetermined time of day information and calendar information, wherein the adjustment value is determined based on at least one of the group consisting of:
   overlap of the time interval and one or more predetermined date and time of day periods; and
   non-overlap of the time interval and one or more predetermined date and time of day periods; and
   segmenting the images in the image set to generate the plurality of event clusters, wherein segmentation boundaries for each event cluster are determined using at least the determined adjustment value.

12. A system for segmenting an image set to generate a plurality of event clusters, each event cluster including at least one image from the image set, said system comprising:
   a memory for storing data and a computer program;
   one or more computer processors coupled to the memory for executing the computer program, said computer program comprising instructions for:
   accessing, using the one or more computer processors, the image set having time metadata corresponding to each image in the set;
   determining, using the one or more computer processors, a time interval between each pair of neighbouring images in the image set, the neighbouring images in each of said pairs being adjacent in a time ordered sequence, said time interval for each of said pairs being determined from time metadata associated with each image in the pair;
   determining, using the one or more computer processors, an adjustment value for one or more of the determined time intervals based on at least one of predetermined time of day information and calendar information, wherein the adjustment value is determined based on at least one of the group consisting of:
   overlap of the time interval and one or more predetermined date and time of day periods; and
   non-overlap of the time interval and one or more predetermined date and time of day periods; and
   segmenting, using the one or more computer processors, the images in the image set to generate the plurality of event clusters, wherein segmentation boundaries for each event cluster are determined using at least the determined adjustment value.

13. A non-transitory computer readable medium having a program stored thereon for segmenting an image set to generate a plurality of event clusters, each event cluster including at least one image from the image set, said program comprising:

computer readable code for accessing, using one or more computer processors, the image set having time metadata corresponding to each image in the set;

computer readable code for determining, using the one or more computer processors, a time interval between each pair of neighbouring images in the image set, the neighbouring images in each of said pairs being adjacent in a time ordered sequence, said time interval for each of said pairs being determined from time metadata associated with each image in the pair;

computer readable code for determining, using the one or more computer processors, an adjustment value for one or more of the determined time intervals based on at least one of predetermined time of day information and calendar information, wherein the adjustment value is determined based on at least one of the group consisting of:

overlap of the time interval and one or more predetermined date and time of day periods; and non-overlap of the time interval and one or more predetermined date and time of day periods; and computer readable code for segmenting, using the one or more computer processors, the images in the image set to generate the plurality of event clusters, wherein segmentation boundaries for each event cluster are determined using at least the determined adjustment value.

14. A computer implemented method of segmenting an image set to generate a plurality of event clusters, each event cluster including at least one image from the image set, said method comprising:

accessing, using one or more computer processors, the image set having time metadata corresponding to each image in the set;

determining, using the one or more computer processors, a time interval between each pair of neighbouring images in the image set, the neighbouring images in each of said pairs being adjacent in a time ordered sequence, said time interval for each of said pairs being determined from time metadata associated with each image in the pair;

adjusting, using the one or more computer processors, each of the determined time intervals at least in case where the time interval overlaps one or more predetermined date and time of day periods:

segmenting, using the one or more computer processors, the images in the image set to generate the plurality of event clusters, wherein segmentation boundaries for each event cluster are determined using at least the adjusted time intervals.

15. The method according to claim 14, wherein one of the predetermined date and time of day periods is set as a time period within which the photographer was sleeping, and in the adjusting, each of the determined time intervals which overlaps the period is reduced.

16. An apparatus for segmenting an image set to generate a plurality of event clusters, each event cluster including at least one image from the image set, said apparatus comprising:

one or more computer processors; and one or more computer readable memories for storing instructions which, when executed, cause the one or more computer processors to perform operations of:

accessing the image set having time metadata corresponding to each image in the set;

determining a time interval between each pair of neighbouring images in the image set, the neighbouring images in each of said pairs being adjacent in a time ordered sequence, said time interval for each of said pairs being determined from time metadata associated with each image in the pair;

adjusting each of the determined time intervals at least in case where the time interval overlaps one or more predetermined date and time of day periods:

segmenting the images in the image set to generate the plurality of event clusters, wherein segmentation boundaries for each event cluster are determined using at least the adjusted time intervals.

17. A non-transitory computer readable medium having a program stored thereon for segmenting an image set to generate a plurality of event clusters, each event cluster including at least one image from the image set, said program comprising:

computer readable code for accessing, using one or more computer processors, the image set having time metadata corresponding to each image in the set;

computer readable code for determining, using the one or more computer processors, a time interval between each pair of neighbouring images in the image set, the neighbouring images in each of said pairs being adjacent in a time ordered sequence, said time interval for each of said pairs being determined from time metadata associated with each image in the pair;

computer readable code for adjusting, using the one or more computer processors, each of the determined time intervals at least in case where the time interval overlaps one or more predetermined date and time of day periods:

computer readable code for segmenting, using the one or more computer processors, the images in the image set to generate the plurality of event clusters, wherein segmentation boundaries for each event cluster are determined using at least the adjusted time intervals.

* * * * *